Dec. 2, 1958 P. PANHARD 2,862,486
HYDRAULIC CLEARANCE TAKING-UP MECHANISM FOR VALVE GEARS
Filed Dec. 11, 1957 2 Sheets-Sheet 1

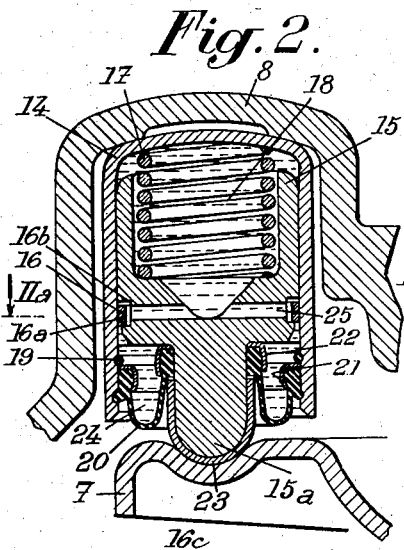
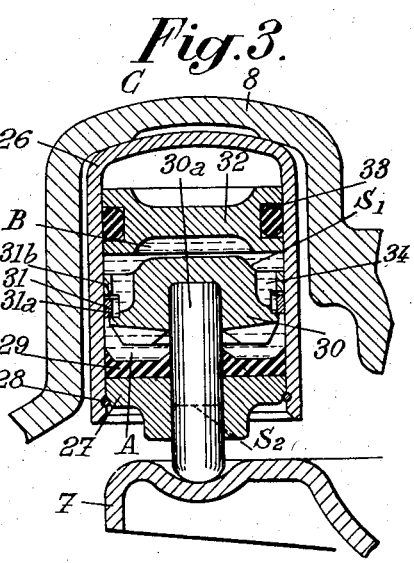
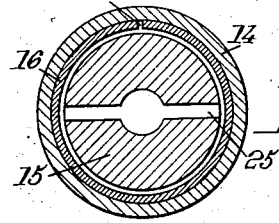
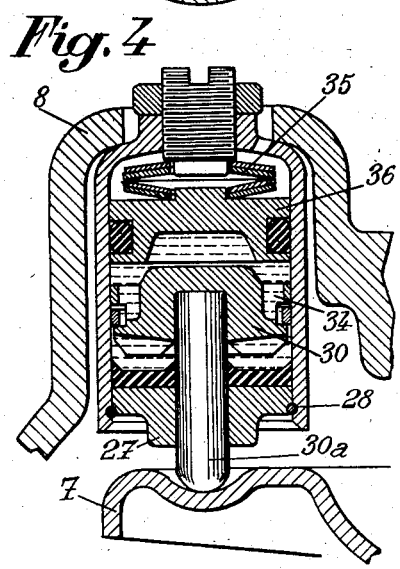
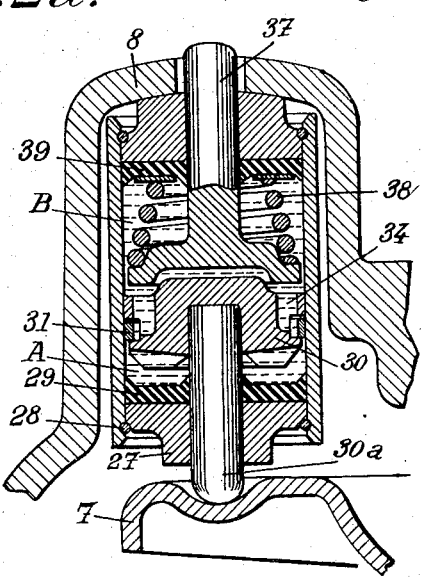

United States Patent Office 2,862,486
Patented Dec. 2, 1958

2,862,486

HYDRAULIC CLEARANCE TAKING-UP MECHANISM FOR VALVE GEARS

Paul Panhard, Paris, France, assignor to Societe Anonyme des Anciens Etablissements Panhard & Levassor, Paris, France, a society of France Application December 11, 1957, Serial No. 702,170

Claims priority, application France December 19, 1956

15 Claims. (Cl. 123—90)

This invention relates to a hydraulic mechanism for automatically taking up clearance in the valve gears of internal combustion engines.

In the known engines provided with such a mechanism the latter is generally fed by means of oil from the lubricating system of the engine itself. This arrangement has the inconvenience of requiring a careful filtering of the oil. The feeding pressure varies and it is more particularly relatively low when the engine is running idle. Also the viscosity of the oil supplied to the mechanism varies in a considerable manner in accordance with the operating temperature of the engine.

A first object of this invention is to provide a self-contained hydraulic clearance taking-up mechanism which will be operative by itself without having to be supplied with oil from an external source.

A further object of this invention is to provide a hydraulic clearance taking-up mechanism which will be more particularly convenient for engines having overhead valves actuated by rockers.

A still further object of this invention is a hydraulic clearance taking up mechanism for an engine having overhead valves actuated by rockers, wherein the fulcrum of each rocker is movable with respect to the cylinder head, the said fulcrum resting, preferably through a lever gearing, against the movable element of a self-contained and liquid-tight hydraulic ram device adapted to form at the same time an abutment and a taking-up member.

A still further object of this invention is to provide a hydraulic ram device for a clearance taking-up mechanism for the valve gears of an internal-combustion engine, comprising a hydraulic cylinder, a piston in said cylinder to divide same into two chambers, namely a working chamber and a supply chamber both being filled with a liquid such as oil, elastic means acting on said piston to urge same in the direction corresponding to the taking-up of the clearance in the valve gear, a check valve disposed between both chambers so as to open when the liquid pressure is higher in the supply chamber than in the working chamber, and reaction means adapted to exert on the piston, when same is moving in the reverse direction with respect to the clearance taking up direction, a resistance higher than the force exerted on said piston by said elastic means in the clearance taking up direction.

It will be appreciated that the clearance taking-up mechanism according to this invention operates in the manner of the conventional hydraulic tappets adapted to be inserted in an engine valve gear, but with this advantage that the improved mechanism does not move with the valve gear and therefore limits in no way the rotational speed by increasing the inertia of the moving parts, while nevertheless operating under the same load and with the same stroke.

Moreover, since the improved hydraulic ram device is not mounted behind the fulcrum of the rocker, it may be perfectly oil-tight and therefore independent from any external supply.

The invention further has for its object certain embodiments of self-contained hydraulic ram devices more particularly adapted for being used in the above-mentioned clearance taking-up mechanism.

In the annexed drawings:

Fig. 2 is an axial section of a first type of hydraulic ram device adapted for being used in the mechanism of Fig. 1.

Fig. 2a is a transverse section taken along line IIa—IIa of Fig. 2.

Figs. 3 to 5 are axial sections of three modifications of the self-contained hydraulic ram.

Figure 1:
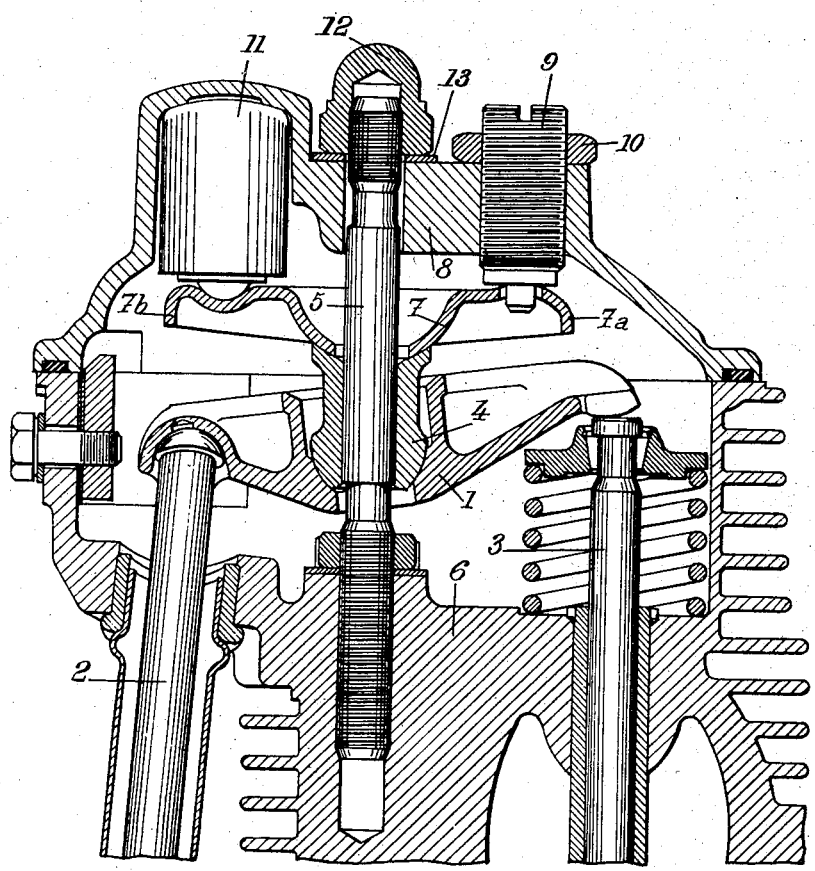
Fig. 1 is a general vertical section of a clearance taking-up mechanism according to this invention.

In Fig. 1 the valve rocker 1 actuated by the pusher rod 2 for lowering the valve stem 3 is fulcrummed on a spherical member 4. In contradistinction to the conventional arrangement member 4 is not secured onto the vertical rod 5 screwed in the cylinder head 6 and on which the said member is mounted, but it is slidable thereon and it engages a lever 7 the ends 7a and 7b of which rest against the cover 8 of the cylinder head, respectively through an adjusting screw 9 provided with a clamping nut 10, and through a self-contained hydraulic ram device 11.

Cover 8 is secured on head 6 by means of a nut 12 screwed on the upper end of rod 5, a resilient washer 13 being interposed between the said nut and the upper side of cover 8.

Since rod 5 is not passed through the hydraulic ram 11, as this would occur if the latter were directly disposed behind member 4, the said ram may be perfectly oil-tight and therefore self-contained, without any external supply.

Figs. 2 and 2a illustrate a first embodiment of such a self-contained hydraulic ram device.

A cylinder 14 has a piston 15 provided with a sealing ring 16, which is split as at 16c, the said ring being adapted to form also a check valve. For this purpose a small axial clearance is provided between ring 16 and the edges 16a, 16b of the corresponding groove of piston 15, whereby the said ring may move axially through a small amount. Piston 15 is urged downwardly by a spring 17. The chamber 18 comprised between piston 15 and the closed upper end of cylinder 14 is the working chamber. A split ring 19 is inserted in a circular groove of cylinder 14 in the vicinity of the open lower end thereof to form a limiting abutment for piston 15.

A flexible diaphragm or bellows 20 is tightly applied by means of rings 21 and 22 on the lower end of cylinder 14 and on the rod 15a of piston 15, while a cap 23 is disposed on rod 15a to retain ring 22 axially. Diaphragm 20 forms the lower wall of the supply chamber 24 situated beneath piston 15 within cylinder 14.

The apparatus is carefully filled with oil without leaving any air entrapped, as for instance by proceeding under vacuum.

The operation is as follows:

When lever 7 presses upwardly against the lower end of the piston rod 15a, as this occurs when the pusher rod 2 acts on rocker 1 for opening the valve, oil is under pressure within chamber 18. The split ring 16 is therefore applied against the lower edge 16a of its groove and oil is prevented from flowing into chamber 24, except through the slit 16c of the split ring, which forms an easily controllable and besides very small leak. Since oil is practically incompressible, piston 15 can only move backwards through a very small amount which may be predetermined at will. When the engine valve is closed, rod 15a is no longer urged upwardly by lever 7 and therefore spring 17 tends to move piston 15 downwardly, thus creating a negative pressure within chamber 18, while chamber 24 substantially remains at atmospheric pressure owing to diaphragm or bellows 20. The pressure difference raises ring 16 which now engages the upper edge 16b of its groove, whereby oil may flow from chamber 24 into chamber 18 via the ducts 25 provided between the bottom of the groove and this latter chamber. Spring 17 may thus move piston 15 downwardly whereby the fulcrum member 4 is displaced towards the cylinder head through lever 7 for taking up the clearance of the valve gear. The mechanism is now ready for the next operating cycle.

Fig. 3 illustrates another embodiment of a self-contained hydraulic ram device. The lower end of the hydraulic cylinder 26 is closed by an end cover 27 retained by a resilient split ring 28 disposed in an appropriate groove of the cylinder, the said cover 27 carrying a sealing washer 29 through which the rod 30a of the hydraulic piston 30 is slidable. As in the above described embodiment piston 30 has a split sealing ring 31 which also operates as a check valve.

A floating piston 32 having an O sealing ring 33 is disposed above piston 30 within cylinder 26 which is thus divided into three chambers A, B and C. Chambers A and B are filled with oil without any air entrapped, as for instance under vacuum, while chamber C is filled with a gas, such as nitrogen, under such a pressure that through the oil of chamber B it exerts on the area $S_1$ of the cross-section of piston 30 a downwardly directed force substantially higher than the maximum load which the ram should bear in normal operation.

When the hydraulic ram is disposed between cover 8 and lever 7, chambers A, B and C are under a pressure equal to the nitrogen pressure within chamber A and the sole external force developed by the ram corresponds to the area $S_2$ of the cross-section of rod 30a, the latter acting as a plunger rod. This force pushes lever 7 downwardly together with fulcrum member 4, thereby taking-up any clearance in the valve gear. When the engine cam actuates the valve, the reaction of the rocker fulcrum is supported by lever 7 which exerts on rod 30a a much higher upwardly directed force. Rod 30a is thus urged backwards, i. e. upwardly, thereby creating a reduction in the pressure within chamber A. Owing to the pressure difference thus obtained between chambers B and A, split ring 31 is applied against the lower edge 31a of its groove, whereby oil is prevented from flowing from chamber B into chamber A, except through the controlled passage provided by the slit of ring 31, as in the case of Figs. 2 and 2a. The main piston 30 therefore only moves backwards through a very small amount. It should be remarked that while in the arrangement of Figs. 2 and 2a the operation was based on an increase of pressure within chamber 18, whereby the unavoidable elasticity of the wall thereof and of the oil contained thereby could permit a small additional backward movement of the main piston, in the case of Fig. 3 the action of the device relies on a reduction of pressure within chamber A which is much smaller than chamber 18 and which only contains a small quantity of oil. The embodiment of Fig. 3 therefore affords a marked advantage in this respect.

When the engine valve is closed, rod 30 is no longer subjected to any load, the pressure within chamber A increases and rises above the pressure within chamber B owing to the fact that the useful cross section of piston 30 with respect to chamber A is reduced by the presence of rod 30a to $S_1-S_2$, while the pressure within chamber B prevails on the full area S of the cross-section of piston 30. The pressure difference thus created raises split ring 31 which moves from edge 31a against edge 31b, whereby oil is permitted to flow from chamber A into chamber B through duct 34, the main piston 30 thus moving downwardly for taking up the clearance of the valve gear under the action of the internal pressure on the area $S_2$ of the cross-section of rod 30a.

It should besides be remarked that another advantage of the modification of Fig. 3 with respect to the embodiment of Figs. 2 and 2a is that the pressure difference which causes oil to flow from a chamber into the other one during the taking-up step of the operating cyclec ould only reach a maximum value equal to atmospheric pressure in the arrangement of Fig. 2, while here its maximum value may be of several kg./cm., since it is only in proportion to the ratio of the respective areas of the cross-section of the piston and of the rod.

Figs. 4 and 5 illustrate modifications of the hydraulic ram device of Fig. 3, the difference residing in the manner of creating the internal oil pressure. In the embodiment of Fig. 4, a strong spring 35 formed of resilient spherical washers urges downwardly an upper piston 36 which is the equivalent of the floating piston 32 of Fig. 3, while spring 35 plays the role of the compressed gas within chamber C of Fig. 3. In the modification of Fig. 5, the upper piston is suppressed together with the upper chamber C and the oil pressure within chamber B is obtained by means of a plunger rod 37 of small diameter urged downwardly by a spring 38 disposed within chamber B. Rod 37 is of course passed through the upper end of the hydraulic cylinder, tightness being ensured by a sealing washer 39. It will be appreciated that the loading spring 38 could also be disposed outside with respect to the cylinder, as for instance above the upper end of the latter.

In all the embodiments described the possible stroke of the hydraulic ram is limited for instance to 3 millimeters and the adjusting screw 9 of Fig. 1 only serves for adjusting the normal position of the parts at a position substantially situated midway with respect to the stroke, when the valve is closed.

What I claim is:

1. A clearance taking-up mechanism for a valve gear embodying an oscillating rocker, comprising a movable member adapted to form a fulcrum for said rocker; a lever on which said member bears at a point on said lever spaced from both ends thereof under the effect of the reaction of said rocker, one end of said lever being pivoted about a fixed point; and a hydraulic taking-up device adapted to support the reaction of the other end of said lever during the operative steps of said valve gear and to take-up the clearance of said valve gear during the inoperative steps thereof.

2. In a mechanism as claimed in claim 1, a fixed rod substantially perpendicular to the mean position of said rocker and passing freely through said rocker, and said member being slidable on said rod to be guided thereby.

3. In a mechanism as claimed in claim 1, a fixed rod substantially perpendicular to the mean position of said rocker and passing freely through said rocker, said member being slidable on said rod to be guided thereby, and said rod being freely passed through said lever.

4. In a mechanism as claimed in claim 1, means to adjust the position of the pivot of said lever.

5. In an internal combustion engine having overhead valves actuated by oscillating rockers disposed above the cylinder head within a space closed by a cover secured to said cylinder head, a clearance taking-up mechanism comprising for each rocker; a rod fixed to said cylinder head and freely passed through said rocker; a member slidable on said rod to form a fulcrum for said rocker; a lever on which said member bears at a point of said lever spaced from both ends thereof under the reaction of said rocker, said lever being apertured for free passage of said rod; means on said cover to form a fixed pivot for one end of said lever; and a hydraulic taking up device secured to said cover and adapted to support the reaction of the other end of said lever during the operative steps of said rocker and to take up the clearance of said rocker during the inoperative steps thereof.

6. In a mechanism as claimed in claim 5, said member being semi-spherical and said rocker having a semi-spherical depression to receive said member, said depression being apertured for free passage of said rod.

7. In a mechanism as claimed in claim 5, said means to pivot one end of said lever being adjustable.

8. In a mechanism as claimed in claim 5, said rod being substantially perpendicular to the mean position of said rocker.

9. In a mechanism as claimed in claim 5, said rod projecting through said cover and the outer end of said rod being screw-threaded to receive a nut to clamp said cover on said cylinder head.

10. A hydraulic clearance take up device for the valve gear of an internal combustion engine comprising a hydraulic cylinder adapted to form one end of said device, said cylinder being closed at both ends; a piston slidable within said cylinder, said piston dividing said cylinder into a working chamber and a supply chamber, both being filled with a liquid; sealing means on said piston to ensure substantially liquid tight engagement of said piston within said cylinder; a rod secured to said piston to form the other end of said device, said rod extending through said supply chamber and passing in liquid-tight relation through the corresponding end of said cylinder; check valve means permitting said liquid to pass from said supply chamber into said working chamber, but substantially preventing reverse flow of said liquid; and means to create within said working chamber a liquid pressure which, when acting on the cross-sectional area of said rod, is sufficient to ensure the clearance taking up force, while, when acting on the cross-sectional area of said piston, it ensures the reaction required to support the load of the valve gear.

11. In a device as claimed in claim 10, means to permit a controlled back flow of liquid from said working chamber into said supply chamber.

12. In a device as claimed in claim 10, said piston having a groove, said sealing means and said check valve means being in the form of a split ring disposed in said groove with a substantial axial clearance, said piston having a duct leading from the bottom of said groove to the side of said piston facing said working chamber, and the slit of said split ring being so dimensioned as to permit a controlled back flow of liquid from said working chamber into said supply chamber.

13. In a device as claimed in claim 10, said means to create a liquid pressure within said working chamber comprising an auxiliary piston tightly slidable within said cylinder on the side of said first-named piston facing said working chamber to form an end wall of same; and spring means acting on said auxiliary piston.

14. In a device as claimed in claim 10, said means to create a liquid pressure within said working chamber comprising an auxiliary piston tightly slidable within said cylinder on the side of said first-named piston facing said working chamber to form an end wall of same; and compressed gas in the space comprised between said auxiliary piston and the adjacent end of said cylinder.

15. In a device as claimed in claim 10, said means to create a liquid pressure within said working chamber comprising a plunger rod tightly slidable in the end of said cylinder which corresponds to said working chamber, and spring means acting on said plunger rod to urge same into said cylinder.

References Cited in the file of this patent

UNITED STATES PATENTS

| | | |
|---|---|---|
| 2,718,219 | Chayne et al. | Sept. 20, 1955 |
| 2,752,902 | Delagarde | July 3, 1956 |
| 2,808,818 | Sampietro | Oct. 8, 1957 |
| 2,813,521 | Sampietro | Nov. 19, 1957 |